US008463786B2

(12) United States Patent
Udupa et al.

(10) Patent No.: US 8,463,786 B2
(45) Date of Patent: Jun. 11, 2013

(54) EXTRACTING TOPICALLY RELATED KEYWORDS FROM RELATED DOCUMENTS

(75) Inventors: Uppinakuduru Raghavendra Udupa, Bangalore (IN); Santosh Raju Vysyaraju, Bangalore (IN)

(73) Assignee: Microsoft Corporation, Redmond, WA (US)

( * ) Notice: Subject to any disclaimer, the term of this patent is extended or adjusted under 35 U.S.C. 154(b) by 198 days.

(21) Appl. No.: 12/813,037

(22) Filed: Jun. 10, 2010

(65) Prior Publication Data

US 2011/0307485 A1 Dec. 15, 2011

(51) Int. Cl.
*G06F 17/00* (2006.01)

(52) U.S. Cl.
USPC ........... 707/737; 707/748; 707/722; 707/795; 707/804; 707/708

(58) Field of Classification Search
USPC ................. 707/737, 722, 748, 795, 708, 804
See application file for complete search history.

(56) References Cited

U.S. PATENT DOCUMENTS

| | | | |
|---|---|---|---|
| 6,430,551 B1 | 8/2002 | Thelen | |
| 7,440,947 B2 | 10/2008 | Adcock | |
| 7,458,915 B2 * | 12/2008 | Matsuda | 477/107 |
| 7,548,915 B2 * | 6/2009 | Ramer et al. | 705/14.54 |
| 7,630,992 B2 | 12/2009 | Martin | |
| 2008/0195595 A1 | 8/2008 | Masuyama et al. | |
| 2008/0263038 A1 | 10/2008 | Judge et al. | |
| 2009/0006377 A1 | 1/2009 | Kobayashi et al. | |
| 2009/0070346 A1 * | 3/2009 | Savona et al. | 707/100 |
| 2009/0254572 A1 * | 10/2009 | Redlich et al. | 707/10 |
| 2009/0254884 A1 | 10/2009 | Rama et al. | |
| 2011/0213655 A1 * | 9/2011 | Henkin et al. | 705/14.49 |
| 2012/0010958 A1 * | 1/2012 | Ramer et al. | 705/14.46 |

OTHER PUBLICATIONS

He, X., H. Zha, C. H. Q. Ding, H. D. Simon, Web document clustering using hyperlink structures, Computational Statistics & Data Analysis, Nov. 2002, vol. 41, No. 1, pp. 19-45.
Koh, S. M., L.-T. Chia, Web image clustering with reduced keywords and weighted bipartite spectral graph partitioning, Proc. of the 7th Pacific Rim Conf. on Multimedia, Advances in Multimedia Info. Processing, Nov. 2006, pp. 880-889, Hangzhou, China.

* cited by examiner

*Primary Examiner* — Sana Al Hashemi
(74) *Attorney, Agent, or Firm* — Lyon & Harr, LLP; Richard T. Lyon (57) ABSTRACT

Keyword extraction technique embodiments are presented which extract topically related keywords from a set of topically related documents. In one general embodiment, this keyword extraction involves first accessing a set of topically related documents. A number of candidate keywords are then identified from the set of related documents. A weighted keyword candidate-document matrix is formed using these candidate keywords, and it is partitioned into multiple groups of keyword candidates. Dense clusters of keyword candidates whose density exceeds a prescribed density threshold are then identified in each of the groups of keyword candidates. Finally, the keyword candidates associated with each dense cluster are designated as topically related keywords.

20 Claims, 4 Drawing Sheets

EXTRACTING TOPICALLY RELATED KEYWORDS FROM RELATED DOCUMENTS

BACKGROUND

A keyword is a term or phrase that captures the essence of the topic of a document. The automatic extraction of topically relevant keywords from textual documents, such as web pages, word processing files, emails, web-page snippets, and so on, is useful for a variety of applications.

For example, extracted keywords can be employed to catalog or index documents, and then used in a search to efficiently scan the cataloged or indexed items for documents topically relevant to a keyword. Another example is an advertiser who is looking for keywords in a set of documents, such as web pages, for use in contextual targeted advertising. In contextual targeted advertising, an advertiser seeks to insert advertisements into a web page being viewed by a potential customer, which are related to the context of the web page. This increases the chance the potential customer will be interested in the advertisement and so increase the overall effectiveness of the advertising effort. Yet another example is in the field of related searches. In a web-search, a user inputs a search query and a search engine returns search results. Along with the search results, the search engine sometimes also offers a small number of search suggestions to the user based on the query. Keywords extracted from web pages related to the query can be used as the basis for these search suggestions.

SUMMARY

This Summary is provided to introduce a selection of concepts, in a simplified form, that are further described below in the Detailed Description. This Summary is not intended to identify key features or essential features of the claimed subject matter, nor is it intended to be used as an aid in determining the scope of the claimed subject matter.

Keyword extraction technique embodiments described herein extract topically related keywords from a set of topically related documents. In one general embodiment, this keyword extraction involves first accessing a set of topically related documents. A number of candidate keywords are then identified from the set of related documents. A weighted keyword candidate-document matrix is formed using these candidate keywords, and it is partitioned into multiple groups of keyword candidates. Dense clusters of keyword candidates whose density exceeds a prescribed density threshold are then identified in each of the groups. Finally, the keyword candidates associated with each dense cluster are designated as topically related keywords.

DESCRIPTION OF THE DRAWINGS

The specific features, aspects, and advantages of the disclosure will become better understood with regard to the following description, appended claims, and accompanying drawings where:

FIGS. 2A-C depict versions of an exemplary weighted undirected graph, where

DETAILED DESCRIPTION

In the following description of keyword extraction technique embodiments reference is made to the accompanying drawings which form a part hereof, and in which are shown, by way of illustration, specific embodiments in which the technique may be practiced. It is understood that other embodiments may be utilized and structural changes may be made without departing from the scope of the technique.

1.0 Keyword Extraction

Given a set of documents that are related to a common topic, it is likely that topical terms and phrases appear in more than one of the documents. In addition, it is likely that topical terms and phrases co-occur between documents more than non-topical terms and phrases. In view of the foregoing, it is possible to extract keywords from the set of related documents which are closely related to the topic of the documents. Keyword extraction technique embodiments described herein extract these topically related keywords from a set of related documents.

Figure 1:
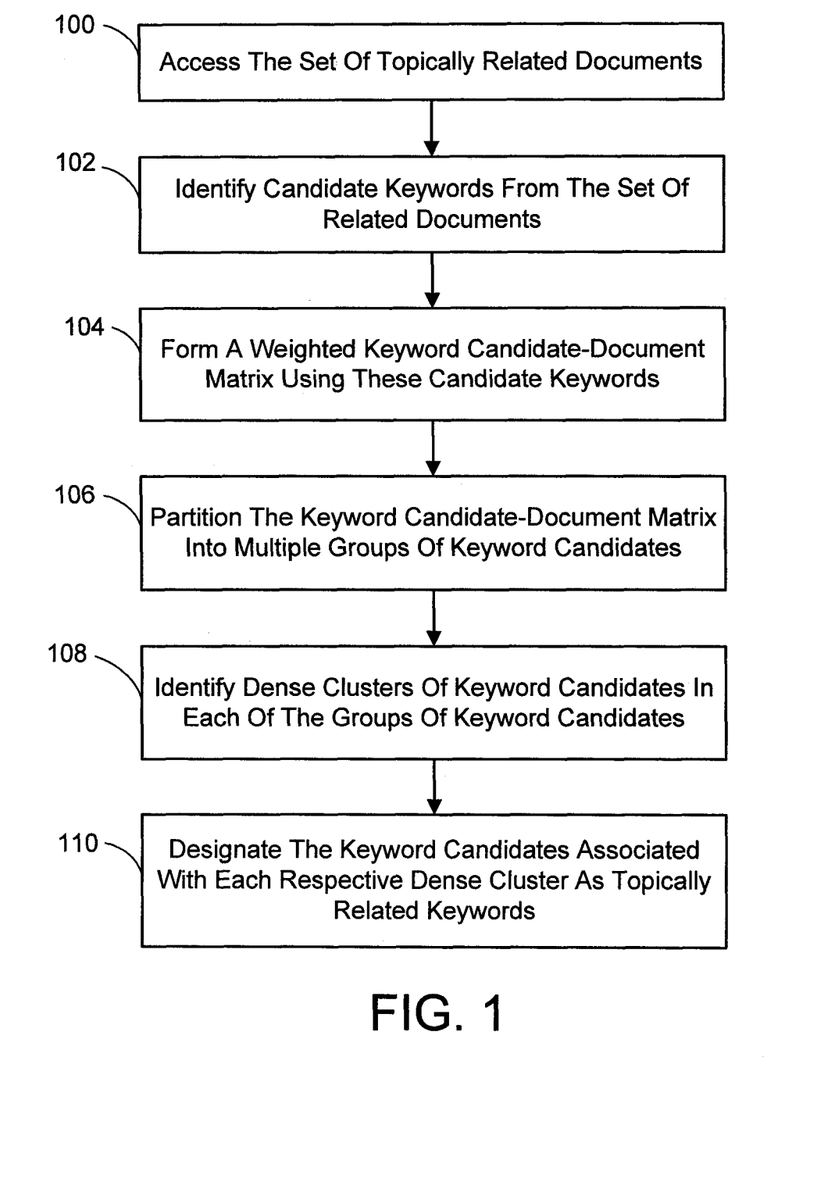
FIG. 1 is a flow diagram generally outlining one embodiment of a process for extracting topically related keywords from a set of topically related documents.

In one general embodiment, the keyword extraction involves first accessing a set of topically related documents (100). A number of candidate keywords are then identified from the set of related documents (102). In one implementation this is accomplished using a controlled vocabulary. It is noted that the candidate keywords and controlled vocabulary can be individual terms or multiple word phrases, or both. A weighted keyword candidate-document matrix is formed using these candidate keywords (104). This matrix captures interactions between the candidate keywords. Next, the keyword candidate-document matrix is partitioned into multiple groups of keyword candidates (e.g., two) (106). In one implementation this is accomplished using spectral partitioning techniques. Dense clusters of keyword candidates whose density exceeds a prescribed density threshold are then identified in each of the groups of keyword candidates via a cluster density analysis (108). The keyword candidates associated with each dense cluster are designated as topically related keywords (110).

The foregoing general actions for extracting keywords will now be described in greater detail in the sections to follow.

1.1 Topically Related Documents

As indicated previously, keyword extraction involves first accessing a set of topically related documents (or just related documents for short). In general, these documents can be any set of topically related textual items.

One good source for documents is the Internet, although this would not be the only source. In general, any electronically searchable source having a collection of documents (or an index thereof) thought to be relevant to a topic of interest can be used. For example, a database known to include documents associated with a topic of interest could be a source (e.g., news archives). In addition, more topic specific domains accessed via the Internet or a proprietary intranet could be a particularly efficient source for related documents pertaining to the corresponding topic (e.g., Wikipedia).

In one embodiment, related documents are obtained using a search engine. A query pertaining to a topic of interest is submitted to a search engine and the documents identified in the search results are used as the set of related documents. For example, a search request to a web search engine using a query will produce a list of Uniform Resource Locators (URLs) identifying web pages that are related to the topic of the query. Thus, the web pages corresponding to the top-N results of a web-search can be employed as a set of related documents.

In one embodiment, the query associated with the topic of interest can be provided by a user who is looking for a set of keywords related to the topic. In another embodiment, a user has already submitted a query to a search engine and the results are employed directly. This later embodiment could be useful in a situation where keywords are suggested to a user for use in follow-on searches based on the results of a current search.

In yet another embodiment, the query is constructed based on a document submitted by a user or one that the user is currently accessing. For example, a list of keywords related to the topic of a web page a user is currently viewing could be provided. In the cases where the query is constructed, this can be accomplished in a number of ways. For instance, the title of the document could be employed as the search query. The title of a document is often available in metadata associated with the document. For example, the title of a web page can be extracted from the HTML file or URL string associated with the page. In the context of a web page, it would also be possible to employ the all or a part of the URL string as the search query if it is not too long for the search engine. Also, all or some of the keywords obtained in the metadata of the web page could be used as the search query.

It is also noted that the search results employed as the set of related documents need not come from just one search engine. In one implementation, the same query is submitted to multiple search engines and the top-N non-repeated results from each search engine are used as the set of related documents. Further, in another implementation the same query is used, but the search is conducted in multiple sources (either by the same or multiple search engines). The top-N results from each source are then used as the set of related documents. One particular version of this multiple source implementation involves searching as one of the sources an on-line encyclopedia-type site (such as Wikipedia). The results produced from such a source can also be used in candidate keyword extraction as described in the next section.

1.2 Candidate Keyword Extraction

Any term or phrase appearing in the set of related documents can be a potential candidate keyword. Identifying potential candidate keywords among these terms and phrases can be accomplished using any appropriate method, such as employing a phrase identifier method (e.g., Named Entity Recognizers). However, in one implementation, rather than using a phrase identifier method, the potential candidate keywords are identified in the documents using a controlled vocabulary of keywords. A controlled vocabulary of keywords is a list of keywords that are believed to be relevant to the topic of the related documents. If a potential candidate keyword gleaned from the documents is found on in the controlled vocabulary list, then it is deemed a candidate keyword. However, if it is not found on the list, then it is eliminated from further consideration.

Using a controlled vocabulary of keywords has distinct advantages. For example, it reduces the number of invalid terms and phrases that are identified as candidate keywords. This is especially true when the documents contain semi structured text or hypertext (e.g., web pages) as there is no control on the structure of the content. The use of a controlled vocabulary of keywords also reduces the number of non-informational terms and phrases that are identified as candidate keywords. Non-informational terms and phrases are those that which do not contain any information on the topic of the related documents. An example of this would be the phrases "a leading proponent" and "strong action" in an excerpt reading "German Chancellor Angela Merkel, a leading proponent of strong action to confront global warming". These phrases do not convey any information on the topic, which might be "German Chancellor Angela Merkel" or "global warming".

There are many ways to obtain a controlled vocabulary of keywords specific to the topic of a set of related documents. For example, in a scenario where an advertiser is looking for keywords in a set of documents (such as web pages) for use in contextual targeted advertising (e.g., inserting advertisements that are related to the context of the web pages), the advertiser can provide a so-called advertisement dictionary containing bid terms and phrases relevant to the advertising being considered for insertion.

Another example of a controlled vocabulary of keywords specific to the topic of a set of related documents is one that is generated using an authoritative source on the topic of the documents. In one implementation, such a controlled vocabulary list can be obtained from an on-line encyclopedia-type site (e.g., Wikipedia). Such sites are known to provide information on a diverse set of topics. Each article excluding category pages, help pages, and the like, provides information on a distinct concept. One way of mining topical keywords from encyclopedia-type site article is to search the site using a query pertaining to the topic of interest. For example, the same query or a similar query to that used to obtain the set of related documents could be used for this purpose. Once a number of related articles are identified, relevant keywords can be derived from them. For example, in one implementation the terms and phrases found in the titles of the articles are considered to be relevant keywords, and used to construct controlled vocabulary. However, it is not intended to limit the collection of keywords for the controlled vocabulary to just article titles. Other parts of an article, such as a keyword list, abstract, summary, and so on, could also be used.

Yet another example of a controlled vocabulary of keywords specific to the topic of a set of related documents is one that is generated using other queries, such as those that can be identified from a various logs including, but not limited to, search engine logs and web browser logs. More particularly, queries that resulted in one or more of the documents in the set of related documents to be returned as search results, could be deemed to be relevant and used to construct the controlled vocabulary.

1.3 Partitioning

The extracted candidate keywords are partitioned into multiple sets (e.g., two) of related phrases. The association between the candidate keywords is generally determined from their co-occurrence in documents. For example, it is assumed that if two candidate keywords are related they are likely to co-occur in several documents.

In order to capture the interactions between candidate keywords in the documents, a candidate keyword by document matrix is constructed. In one implementation of this matrix, the rows (i) represent candidate keywords (t) and the columns (j) represent the set of related documents (D). Each element in the matrix is filled with a weight (A) that is a function of the frequency that the corresponding candidate keyword appears in the corresponding document. In one implementation, the element weight A is computed as:

$$A_{ij} = \text{global}(t_i) * \text{local}(t_i, D_j). \tag{1}$$

The local term of Eq. (1) represents a frequency factor of a candidate keyword (t)-document (D) pair. In one implementation, the local term is computed as:

$$\frac{\text{\# of times the } t_i \text{ appears in } D_j}{\text{Sum of the \# of times each } t \text{ appears in } D_j}. \quad (2)$$

The global term of Eq. (1) represents an importance factor of a candidate keyword. For example, in the context of the aforementioned advertiser who is looking for keywords in a set of documents for use in contextual targeted advertising, the advertisement dictionary can include importance factors for some or all of the keywords listed therein. In this way the advertiser can emphasis the importance of certain keywords in the partition procedure. If there is no importance factor associated with a keyword it is simply set to 1.

The partitioning is then performed using a spectral partitioning technique. For example, appropriate spectral partitioning techniques include, but are not limited to, singular value decomposition (SVD), or co-clustering (also sometimes referred to as biclustering or two-mode clustering), or non-negative matrix factorization (NMF).

It is noted that spectral partitioning techniques generally divide the matrix elements into two groups, which is usually sufficient. However, in some circumstances there may be more than two topics in a set of related documents. If this is suspected, then the spectral partitioning can be repeated on each group identified in the previous iteration of the partitioning. Thus, the partitioning procedure could result in $2^n$ groups (e.g., 2, 4, 8 . . . ). The goal of this multiple partition scheme is to reduce the complexity of the clustering analysis which will be described next.

1.4 Cluster Analysis

The extracted candidate keyword partitions each have at least one set of candidate keywords which may be related to each other. Each of the partitions is analyzed to find if a subset of candidate keywords therein forms a dense cluster. If a partition has a dense cluster, then the candidate keywords making up the dense cluster are designated as related keywords. This is done as it is assumed that keywords relevant to a topic are likely to be strongly connected and form a dense cluster.

Cluster analysis is generally performed by constructing a co-occurrence graph for the candidate keywords in a partition. After constructing the graph, one or more sub-graphs are identified and classified based on a measure of their density. If the density is great enough, the candidate keywords in the sub-graph are deemed to be related keywords.

Figure 2A:
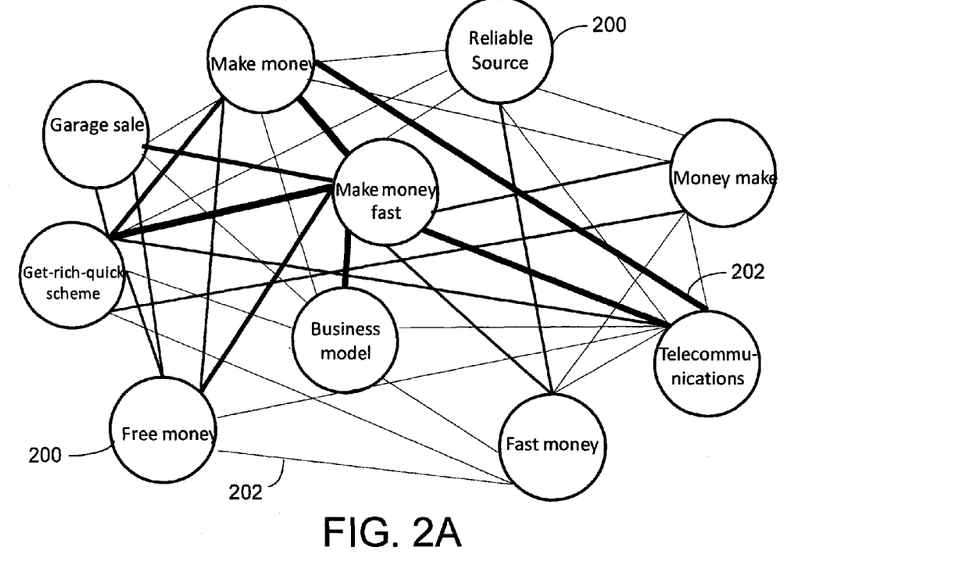
FIG. 2A shows a graph representing all the vertices and edges of a partition.
Figure 2B:
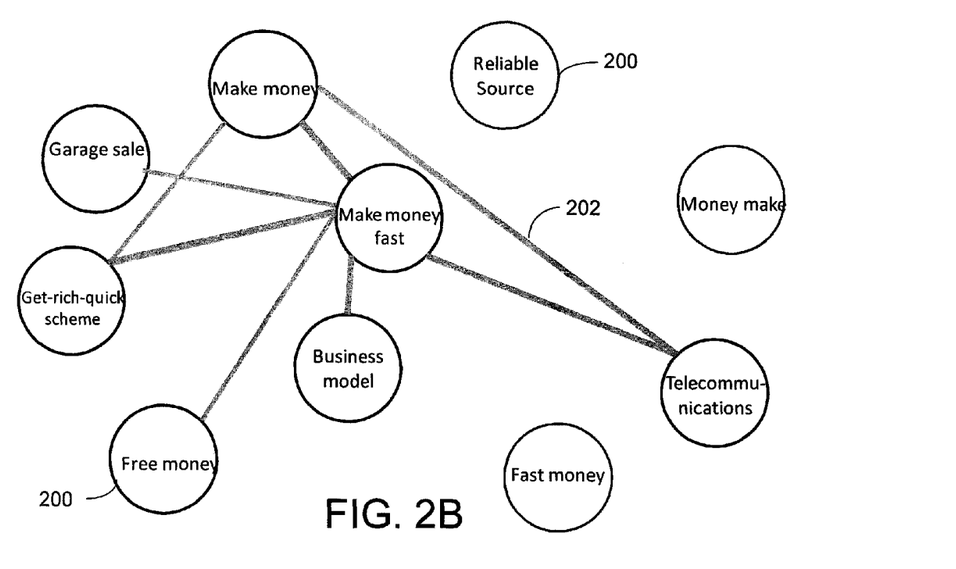
FIG. 2B shows the graph of FIG. 2A after the weak edges have been removed.
Figure 2C:
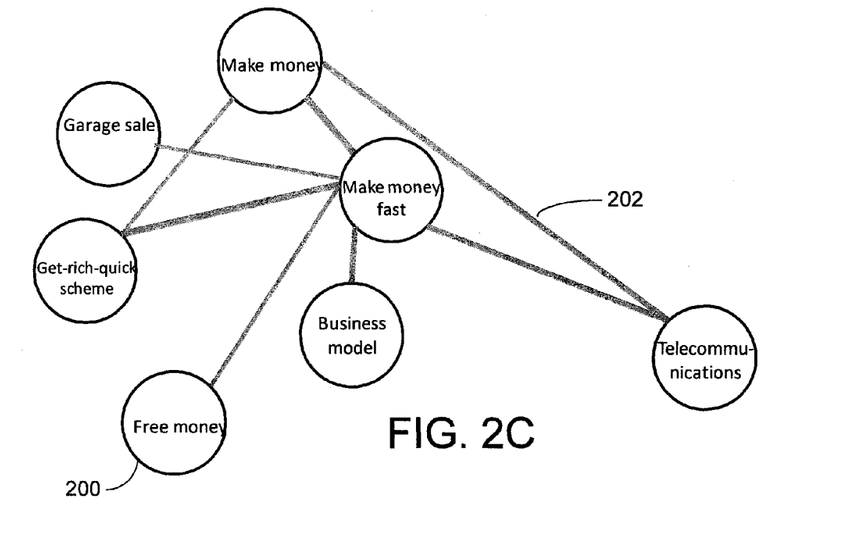
FIG. 2C shows the graph of FIG. 2A after both the weak edges and the isolated vertices are removed leaving a single sub-graph.

In one implementation, the co-occurrence graph is a weighted undirected graph G:(V, E). Each vertex V (or node) in graph G represents a candidate keyword and each edge in the graph represents the co-occurrences of candidate keywords in the documents. The weight of an edge $w_{ij}$ between two vertices $v_i$ and $v_j$ is equal to the number of documents in which the candidate keywords corresponding to the vertices co-occur. Thus, graph G would contain an edge between all pairs of candidate keywords that co-occur in at least one document. A simplified exemplary graph is shown in FIG. 2A, where the vertices 200 are shown as circles with the corresponding candidate keyword appearing therein, and where the edges 202 are shown as lines connecting the vertices with the thickness of each line being proportional to the edge's weight. To ensure that each edge actually represents a strong association between a pair of candidate keywords, weak edges that do not meet a minimum edge weight threshold $w_{min}$ are discarded. In one implementation, the minimum edge weight is three. FIG. 2B shows what the exemplary graph of FIG. 2A might look like with the weak edges removed. The discarding of weak edges may result in isolated vertices that are not connected to any other vertices in the graph. Such isolated vertices associated with the candidate keywords "reliable source", "money make" and "fast money" are shown in FIG. 2B. These isolated vertices are pruned from the graph resulting in at least one subset of candidate keywords. If there are no isolated nodes after discarding the weak edges, the resulting sub-graph would contain all the candidate keywords in the partition. FIG. 2C shows the remaining sub-graph associated with the exemplary graph of FIG. 2A after the isolated vertices are removed.

Next, the density of each sub-graph in a partition is computed. In one implementation, the sub-graph density (SD) is computed as:

$$SD = \Sigma_{v_i \in V} \Sigma_{v_j \in V - \{v_i\}} \{w_{ij} - w_{min}\}. \quad (3)$$

A sub-graph is considered a dense sub-graph if its SD value exceeds a density threshold. This density threshold is determined empirically. For example, in one tested embodiment, a density threshold of three was employed successfully. Once the dense sub-graphs are identified, the candidate keywords in each dense sub-graph respectively are designated as topically related keywords. In other words, each sub-graph represents a separate group of related keywords.

Figure 3:
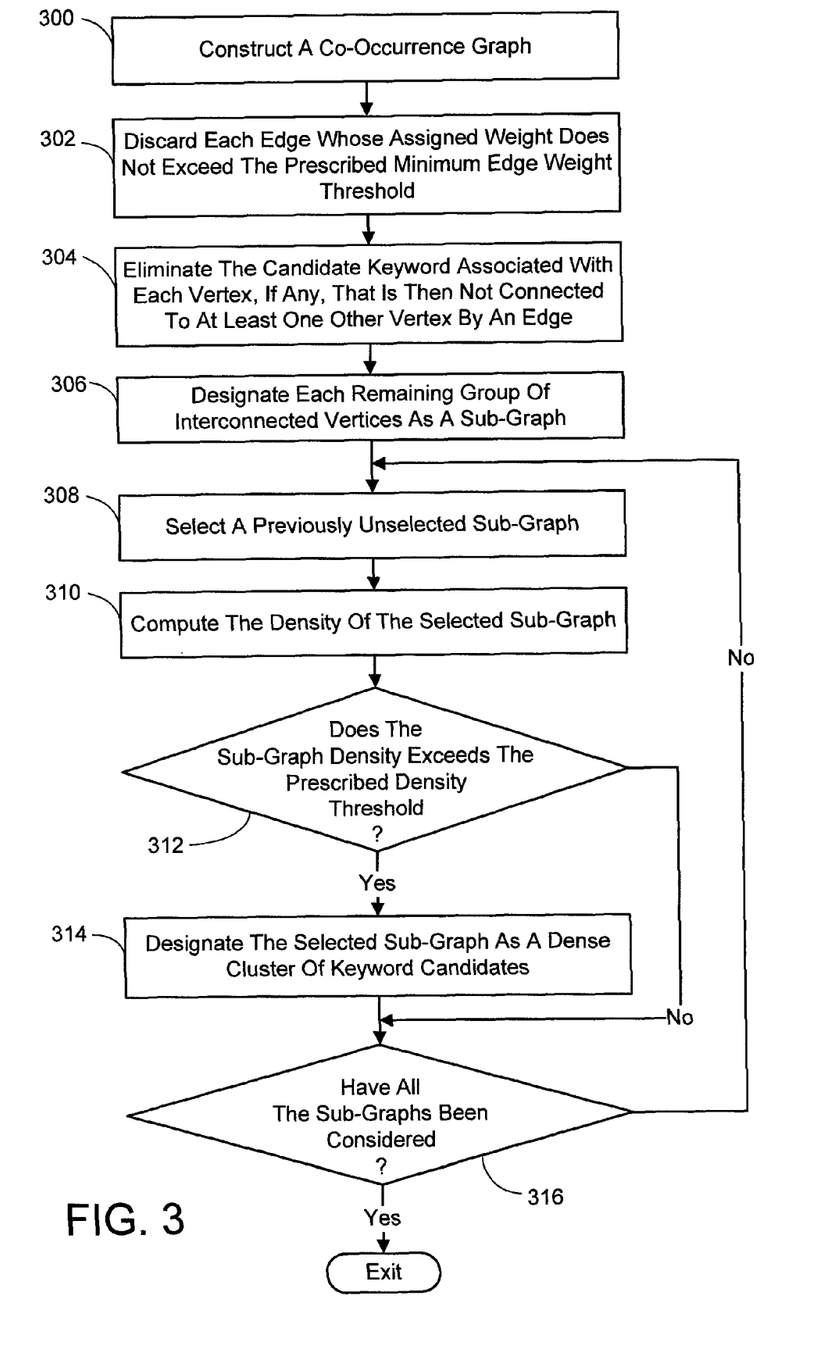
FIG. 3 is a flow diagram generally outlining an implementation of the part of the process of FIG. 1 involving cluster analysis.

Given the foregoing, in one implementation cluster analysis is accomplished as outlined in FIG. 3 for each of the partitions of keyword candidates. First, a co-occurrence graph is constructed (300). As described previously this can take the form of a weighted undirected graph where each vertex represents a different one of the candidate keywords and each edge connects a pair of vertices whose corresponding candidate keywords co-occur in at least one of the documents in the set of related documents. In addition, a weight is assigned to each edge which represents the number of documents in which the candidate keywords associated with the connected vertices co-occur. Next, each edge whose assigned weight does not exceed a prescribed minimum edge weight threshold is discarded (302), and the candidate keyword associated with each vertex, if any, that is then not connected to at least one other vertex by an edge is eliminated from consideration as a related keyword (304). Each remaining group of interconnected vertices is designated as a sub-graph (306), and a previously unselected sub-graph is selected (308). The density of the selected sub-graph is then computed (310), and it is determined if its density exceeds the aforementioned prescribed density threshold (312). If the selected sub-graph's density exceeds the density threshold, then it is designated as a dense cluster of keyword candidates (314). Otherwise, no designation is made. It is then determined if all the sub-graphs have been selected. If not, then process actions 308 through 314 are repeated until all the sub-graphs have been considered.

2.0 The Computing Environment

A brief, general description of a suitable computing environment in which portions of the keyword extraction technique embodiments described herein may be implemented will now be described. The technique embodiments are operational with numerous general purpose or special purpose computing system environments or configurations. Examples of well known computing systems, environments, and/or configurations that may be suitable include, but are not limited to, personal computers, server computers, hand-held or laptop devices, multiprocessor systems, microprocessorbased systems, set top boxes, programmable consumer electronics, network PCs, minicomputers, mainframe computers, distributed computing environments that include any of the above systems or devices, and the like.

Figure 4:
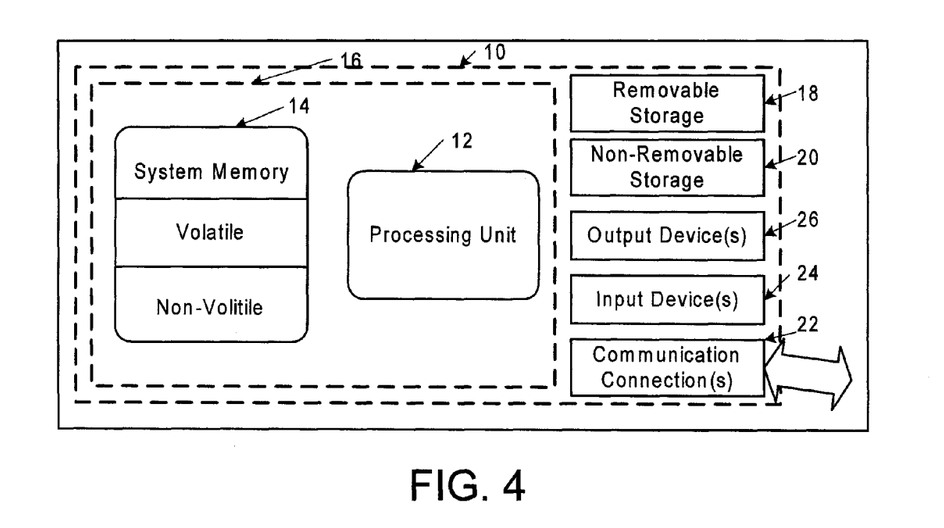
FIG. 4 is a diagram depicting a general purpose computing device constituting an exemplary system for implementing keyword extraction technique embodiments described herein.

FIG. 4 illustrates an example of a suitable computing system environment. The computing system environment is only one example of a suitable computing environment and is not intended to suggest any limitation as to the scope of use or functionality of keyword extraction technique embodiments described herein. Neither should the computing environment be interpreted as having any dependency or requirement relating to any one or combination of components illustrated in the exemplary operating environment. With reference to FIG. 4, an exemplary system for implementing the embodiments described herein includes a computing device, such as computing device 10. In its most basic configuration, computing device 10 typically includes at least one processing unit 12 and memory 14. Depending on the exact configuration and type of computing device, memory 14 may be volatile (such as RAM), non-volatile (such as ROM, flash memory, etc.) or some combination of the two. This most basic configuration is illustrated in FIG. 4 by dashed line 16. Additionally, device 10 may also have additional features/functionality. For example, device 10 may also include additional storage (removable and/or non-removable) including, but not limited to, magnetic or optical disks or tape. Such additional storage is illustrated in FIG. 4 by removable storage 18 and non-removable storage 20. Computer storage media includes volatile and nonvolatile, removable and non-removable media implemented in any method or technology for storage of information such as computer readable instructions, data structures, program modules or other data. Memory 14, removable storage 18 and non-removable storage 20 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 10. Any such computer storage media may be part of device 10.

Device 10 may also contain communications connection(s) 22 that allow the device to communicate with other devices. Device 10 may also have input device(s) 24 such as keyboard, mouse, pen, voice input device, touch input device, camera, etc. Output device(s) 26 such as a display, speakers, printer, etc. may also be included. All these devices are well known in the art and need not be discussed at length here.

The keyword extraction technique embodiments described herein may be further described in the general context of computer-executable instructions, such as program modules, being executed by a computing device. Generally, program modules include routines, programs, objects, components, data structures, etc. that perform particular tasks or implement particular abstract data types. The embodiments described herein may also be practiced in distributed computing environments where tasks are performed by remote processing devices that are linked through a communications network. In a distributed computing environment, program modules may be located in both local and remote computer storage media including memory storage devices.

3.0 Other Embodiments

It is noted that any or all of the aforementioned embodiments throughout the description may be used in any combination desired to form additional hybrid embodiments. In addition, although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Wherefore, what is claimed is:

1. A computer-implemented process for extracting topically related keywords from topically related documents, comprising:
    using a computer to perform the following process actions:
        accessing a set of topically related documents;
        identifying a number of candidate keywords from the set of related documents, wherein a candidate keyword can be an individual term or a multiple word phrase;
        forming a weighted keyword candidate-document matrix using the candidate keywords;
        partitioning the keyword candidate-document matrix into multiple groups of keyword candidates;
        identifying dense clusters of keyword candidates in each of the groups of keyword candidates whose density exceeds a prescribed density threshold, said keyword candidate cluster density for a group of keyword candidates being based on co-occurrences of keyword candidates belonging to the group in documents from the set of related documents; and
        for each of the identified dense clusters,
            designating the keyword candidates associated with that cluster as topically related keywords, and
            extracting the topically related keywords from the set of topically related documents.

2. The process of claim 1, wherein the process action of accessing a set of topically related documents comprises an action of accessing documents identified in a prescribed number of the top ranking search results found in one or more searches based on a search query pertaining a topic of interest.

3. The process of claim 2, wherein the search query is provided by a user.

4. The process of claim 2, wherein the search results are provided by a user.

5. The process of claim 2, wherein the search query is constructed using a Uniform Resource Locator (URL) corresponding to a user-supplied document or a document a user is accessing.

6. The process of claim 5, wherein the search query is constructed using a title of the document.

7. The process of claim 5, wherein the search query is constructed using all or a part of the URL string of the document.

8. The process of claim 1, wherein the process action of identifying candidate keywords from the set of related documents, comprises an action of using a controlled vocabulary, wherein the controlled vocabulary comprises a list of keywords believed to be relevant to a topic of interest associated with the set of related document, and wherein only terms and phrases found in the set of related documents that are included in the controlled vocabulary are identified as candidate keywords.

9. The process of claim 8, wherein the process action of using a controlled vocabulary, comprises an action of obtaining the controlled vocabulary, said obtaining comprising searching an encyclopedia-type site using a search query pertaining said topic of interest and employing a prescribed number of top ranking articles returned as search results to establish the controlled vocabulary.

10. The process of claim 9, wherein titles of said articles are employed to establish the controlled vocabulary.

11. The process of claim 8, wherein the process action of using a controlled vocabulary, comprises obtaining an advertisement dictionary and employing the terms and phrases included therein as the controlled vocabulary.

12. The process of claim 8, wherein the process action of using a controlled vocabulary, comprises an action of obtaining the controlled vocabulary, said obtaining comprising identifying search queries used in previous searches that produced search results identifying one or more of the documents in the set of related document, and employing the identified search queries to establish the controlled vocabulary.

13. The process of claim 1, wherein the process action of forming a weighted keyword candidate-document matrix using the candidate keywords, comprises for each keyword candidate-document pair in the matrix assigning an element weight computed as the product of an importance factor representing a prescribed degree of importance assigned to the keyword candidate of the pair, and a computed frequency factor representing a measure of the frequency that the keyword candidate of the pair appears in the document of the pair.

14. The process of claim 13, wherein computing the frequency factor comprises computing the quotient of the number of times the keyword candidate of the pair appears in the document of the pair, divided by the sum of the number of times each of the candidate keywords appears in the document of the pair.

15. The process of claim 1, wherein the process action of partitioning the keyword candidate-document matrix into multiple groups of keyword candidates, comprises employing a spectral partitioning technique.

16. The process of claim 15, wherein the spectral partitioning technique is employed to partition the matrix into two groups of keyword candidates.

17. The process of claim 1, wherein the process action of identifying clusters of keyword candidates in each of the groups of keyword candidates, comprises the action of:
constructing a co-occurrence graph in the form of a weighted undirected graph comprising vertices and edges, wherein each vertex represents a different one of the candidate keywords and each edge connects a pair of vertices whose corresponding candidate keywords co-occur in at least one of the documents in the set of related documents, and wherein a weight is assigned to each edge which represents the number of documents in which the candidate keywords associated with the connected vertices co-occur;
discarding each edge whose assigned weight does not exceed a prescribed minimum edge weight threshold;
eliminating the candidate keyword associated with each vertex, if any, that is not connected to at least one other vertex by an edge, from consideration as a related keyword;
designating each group of interconnected vertices as a sub-graph;
for each sub-graph,
computing the density of the sub-graph,
determining if the sub-graph density exceeds a prescribed density threshold, and
designating the sub-graph as a dense cluster of keyword candidates whenever its density exceeds the prescribed density threshold.

18. The process of claim 17, wherein the process action of computing the density of a sub-graph, comprises:
for each vertex of the sub-graph,
identifying the edges connected to the vertex under consideration,
for each identified edge, computing the difference between the weight assigned to that edge and the prescribed minimum edge weight threshold, and
summing the computed differences to establish a vertex sum for the vertex under consideration; and
summing the vertex sums computed for the vertices of the sub-graph.

19. A computer-readable computer storage medium having computer-executable instructions for performing the process actions recited in claim 1.

20. A system for extracting topically related keywords from topically related documents, comprising:
a general purpose computing device; and
a computer program comprising program modules executable by the computing device, wherein the computing device is directed by the program modules of the computer program to,
access a set of topically related documents,
extract a number of candidate keywords from the set of related documents using a controlled vocabulary, wherein the controlled vocabulary comprises a list of keywords believed to be relevant to a topic of interest associated with the set of related document, and wherein only terms and phrases found in the set of related documents that are included in the controlled vocabulary are identified as candidate keywords,
form a weighted keyword candidate-document matrix using the candidate keywords, and partition the matrix into multiple groups of keyword candidates using a spectral partitioning technique,
identify dense clusters of keyword candidates in each of the groups of keyword candidates whose density exceeds a prescribed density threshold, said keyword candidate cluster density for a group of keyword candidates being based on co-occurrences of keyword candidates belonging to the group in documents from the set of related documents, and
for each of the identified dense clusters,
designate the keyword candidates associated with that cluster as topically related keywords, and
extract the topically related keywords from the set of topically related documents.

* * * * *

UNITED STATES PATENT AND TRADEMARK OFFICE
CERTIFICATE OF CORRECTION

PATENT NO. : 8,463,786 B2  Page 1 of 1
APPLICATION NO. : 12/813037
DATED : June 11, 2013
INVENTOR(S) : Udupa et al.

It is certified that error appears in the above-identified patent and that said Letters Patent is hereby corrected as shown below:

In the Drawing, Drawing Sheet 3 of 4, Fig. 4, delete "Volitile" and insert -- Volatile --, therefor.

Signed and Sealed this
Tenth Day of February, 2015

Michelle K. Lee
*Deputy Director of the United States Patent and Trademark Office*